(12) United States Patent
Boscaro et al.

(10) Patent No.: US 10,988,320 B2
(45) Date of Patent: Apr. 27, 2021

(54) SCREW TRANSPORT APPARATUS FOR BOTTLES AND BOTTLING SYSTEM PROVIDED WITH SUCH AN APPARATUS

(71) Applicant: MBF S.p.A., Verona (IT)

(72) Inventors: Giuliano Boscaro, Verona (IT); Alessandro Ticinelli, Verona (IT)

(73) Assignee: MBF S.p.A

( * ) Notice: Subject to any disclaimer, the term of this patent is extended or adjusted under 35 U.S.C. 154(b) by 0 days.

(21) Appl. No.: 16/524,597

(22) Filed: Jul. 29, 2019

(65) Prior Publication Data
US 2020/0039753 A1 Feb. 6, 2020

(30) Foreign Application Priority Data

Aug. 1, 2018 (IT) .......................... 102018000007725

(51) Int. Cl.
| | |
|---|---|
| *B65G 33/04* | (2006.01) |
| *B65G 33/14* | (2006.01) |
| *B65G 33/26* | (2006.01) |
| *B65G 47/08* | (2006.01) |

(52) U.S. Cl.
CPC ............. *B65G 33/04* (2013.01); *B65G 33/26* (2013.01); *B65G 47/08* (2013.01); *B65G 2201/0244* (2013.01)

(58) Field of Classification Search
CPC ......... B65G 33/04; B65G 33/26; B65G 33/14
USPC ................. 198/657, 661, 670, 676
See application file for complete search history.

(56) References Cited

U.S. PATENT DOCUMENTS

| 4,252,230 A * | 2/1981 | Eriksson ................ B65G 37/00 198/346.2 |
| 4,266,651 A * | 5/1981 | Strom .................... B65G 47/29 198/345.1 |
| 4,566,583 A * | 1/1986 | Schneider .............. B65G 33/04 198/459.4 |
| 4,969,348 A * | 11/1990 | Clowes .................. B23Q 7/002 198/625 |
| 5,341,918 A | 8/1994 | Covert |

(Continued)

FOREIGN PATENT DOCUMENTS

DE 2920106 11/1980

OTHER PUBLICATIONS

US 2011/0259709 A1, Grossman, Oct. 27 (Year: 2011).*
Search Report, The Hauge, dated Apr. 9, 2019.

*Primary Examiner* — Douglas A Hess
(74) *Attorney, Agent, or Firm* — Valauskas Corder LLC (57) ABSTRACT

The present invention relates to a screw transport apparatus for bottles, comprising: —a support structure, which extends longitudinally between a bottle inlet 1*a* and a bottle outlet 1*b* of the apparatus, and—a spiral-shaped helical body, which is associated with the support structure and extends axially parallel to the support structure between two own axial ends. The above spiral-shaped helical body can be rotated on itself about its own longitudinal axis to move bottles in cooperation with the support structure. The spiral-shaped helical body comprises at least two spiral-shaped seats, which extend coaxially between the two axial ends. They are angularly offset from each other and differ from each other by the shape and/or dimensions of the relative bottle housing compartment defined by each of them. The two spiral-shaped seats are intended to be used alternatively to the other for the transport of bottles having different shapes and/or dimensions.

17 Claims, 10 Drawing Sheets

(56) References Cited

U.S. PATENT DOCUMENTS

| | | | | |
|---|---|---|---|---|
| 5,477,956 A * | 12/1995 | Liebhart | ............... | B65G 33/04 198/346.2 |
| 5,697,489 A * | 12/1997 | Deonarine | ............. | B65G 33/04 198/464.4 |
| 5,810,151 A * | 9/1998 | Catelli | .................. | B65G 33/04 198/402 |
| 6,189,675 B1 * | 2/2001 | Nosch | ...................... | B65C 9/04 198/394 |
| 6,386,353 B1 | 5/2002 | Gerber | | |
| 7,284,577 B2 * | 10/2007 | Yoneda | ................. | B65G 33/04 141/129 |
| 7,811,075 B2 * | 10/2010 | Shimada | ................ | B29C 48/07 425/208 |
| 9,422,113 B2 * | 8/2016 | Glock | .................... | B65G 47/71 |
| 10,227,150 B2 * | 3/2019 | Trebbi | ................. | B65G 47/082 |
| 2017/0285200 A1 | 10/2017 | Fyffe et al. | | |

\* cited by examiner

FIG.11

SCREW TRANSPORT APPARATUS FOR BOTTLES AND BOTTLING SYSTEM PROVIDED WITH SUCH AN APPARATUS

FIELD OF APPLICATION

The present invention relates to a screw transport apparatus for bottles and to a bottling system provided with such an apparatus.

PRIOR ART

In the bottling sector, for transporting bottles from one station to another of the plants it has long been known to use screw apparatuses.

Generally, a station of a bottling plant consists of a rotary machine, such as a rinsing machine, a filling machine or a capping machine.

Figure 1:
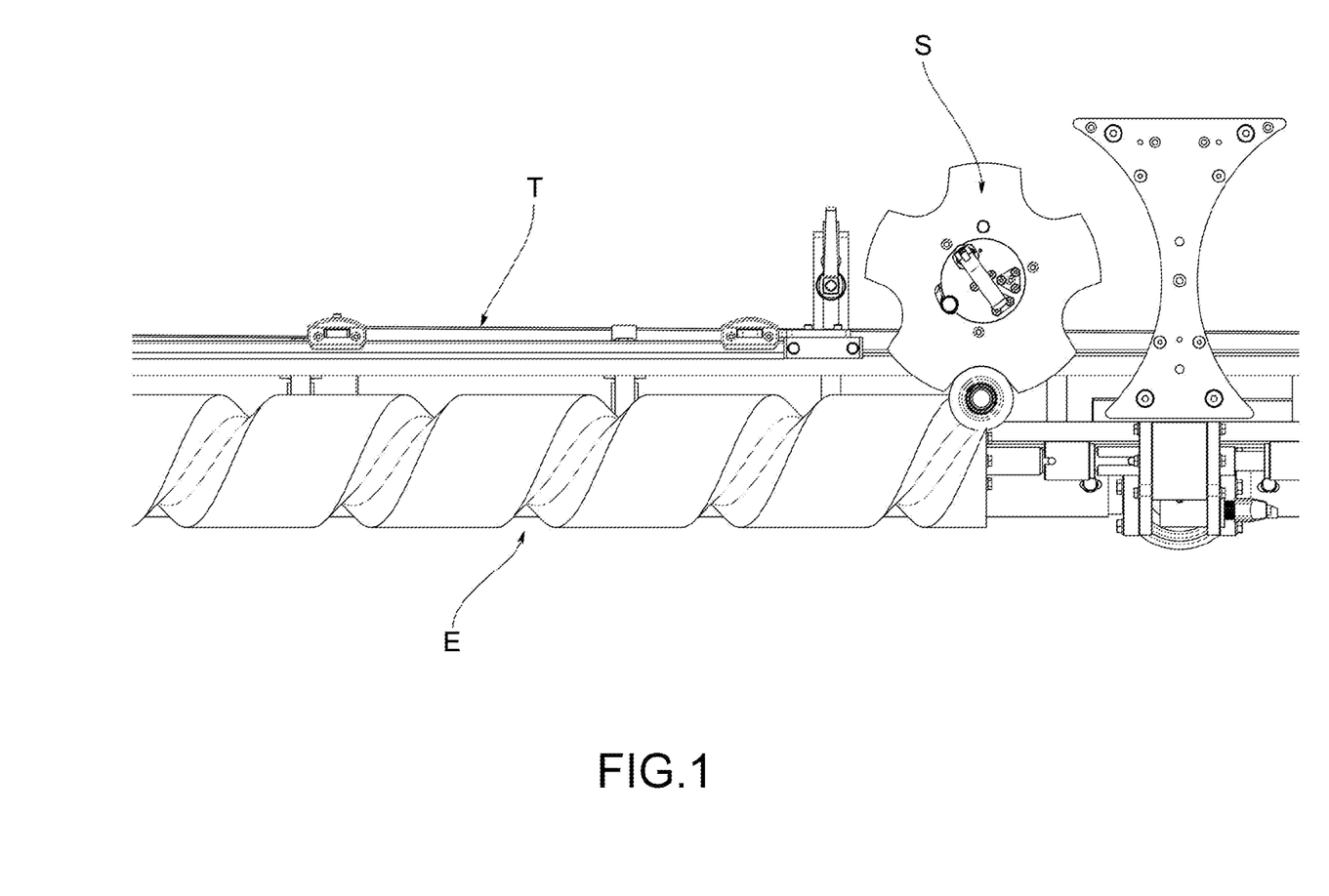
FIGS. 1 and 2 show two schematic views of two traditional screw transport apparatuses for bottles, which differ in the dimensions of the spiral-shaped seat of the screw.
Figure 2:
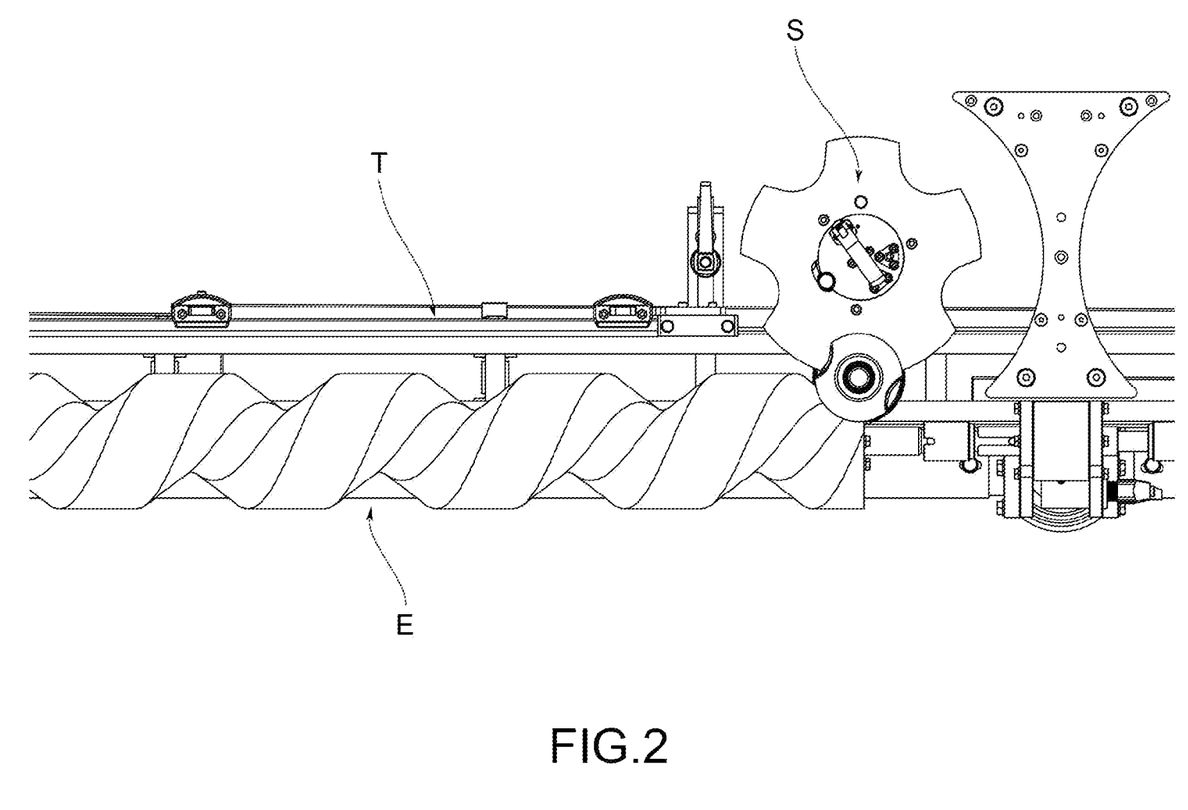

An example of a screw transport apparatus is shown in FIGS. 1 and 2. It comprises a support structure T, which extends along the entire path, and a spiral-shaped helix E, which extends parallel to such a support structure. The spiral-shaped helix defines a spiral seat which extends substantially along the entire length of the helix. In jargon, the spiral-shaped helix is also called "screw", although improperly, since it is not inserted inside a tubular containment body.

Operatively, as shown in FIGS. 1 and 2, the single bottle is arranged inside this spiral seat and is dragged in motion by the rotational motion of the helix E itself, along the support structure T, which acts as a counter guide. In use, the screw apparatus receives the bottles from an inlet star wheel (not shown) and then transfers them to an outlet star wheel S. Operatively, the spiral-shaped seat S must be in phase with the compartments of the two star wheels S.

There are screws dedicated to the transport of a specific bottle format, the latter being defined in terms of the shape and size of the bottle. In this case, the shape and size of the section of the spiral seat correspond to those of the bottle to be transported. Generally, these screws are intended for the movement of bottles having a non-circular sectional plan view, for example square or ovoid. If it is necessary to transport bottles of different sizes or different equivalent diameters, it is necessary to change the screw with one of a suitable type.

There are also "universal" type screws, that is having a spiral seat having a cross-section of shape and size not specifically corresponding to a single bottle format, but capable of engaging different bottle formats. In particular, this type of screw is suitable for transporting bottles having a circular plan section (cylindrical or conical bottles) with a wide range of diameters. This makes the transport apparatus operationally more flexible.

The flexibility in terms of ability to treat different bottle sizes is however limited by the fact that in order to operate, the dimensions of the spiral seat must not differ too much with respect to the dimensions of the bottle. Even a universal type screw therefore has a predefined operating range in terms of treatable bottle sizes. For example, a standard "universal" screw may have an operating range of between 56 mm and 105 mm, in terms of the diameters of bottles with a circular plan section (cylindrical or conical bottles) that can be treated. Therefore, if it is necessary to transport bottles having a format not included in the operating range of the screw (for example with a diameter less than 56 mm), it is necessary to replace the screw with one of a suitable type.

A very felt need among users is to optimize and therefore minimize the format changeover times, as well as the costs for the purchase of accessories necessary to correctly convey the bottles during the processes related to bottling (rinsing, filling and capping).

This requires having a flexible system, capable of adapting to the various operating situations and able to give the user the possibility to perform format changes as quickly as possible, while always guaranteeing the correctness of the final result.

To meet these needs, an important role is played by the operational flexibility of the transport apparatuses between the various stations of the system. In this sense, so-called universal screws meet this requirement.

However, in order to increase the operation of the system to the bottle formats which can be treated by a specific universal screw, it is necessary to have a second universal screw with a different operating range. The replacement of one screw with the other is contemplated in case of need. However, the change involves costs and downtime.

The need to increase the operating flexibility of a screw transport apparatus is still very much felt according to the possible variations in the type of bottles managed by the user, further minimizing times and costs associated with bottle format changes.

DISCLOSURE OF THE INVENTION

Therefore, the main object of the present invention is to eliminate all or part of the drawbacks of the aforementioned prior art by providing a screw transport apparatus for bottles which, compared to a conventional screw, allows increasing the operating range but minimizing time and costs related to bottle format changes.

A further object of the present invention is to provide a screw transport apparatus for bottles which is simple and cost-effective to make.

A further object of the present invention is to provide a screw transport apparatus for bottles which is simple and cost-effective to manage.

BRIEF DESCRIPTION OF THE DRAWINGS

The technical features of the invention, according to the aforesaid aims, can clearly be seen in the content of the claims below, and its advantages will become more readily apparent in the detailed description that follows, made with reference to the accompanying drawings, which illustrate one or more purely exemplary and non-limiting embodiments thereof, in which:

FIGS. 4a and 4b show two schematic views of a same screw transport apparatus for bottles according to a preferred embodiment of the invention, illustrated in association with a star wheel, in which FIG. 4a shows the screw with a first spiral-shaped seat in phase with the star wheel and FIG. 4b shows the screw with a second spiral-shaped seat in phase with the star wheel;

DETAILED DESCRIPTION

The screw transport apparatus for bottles according to the invention will be indicated as a whole with reference numeral 1 in the accompanying Figures.

Herein and in the following description and in the claims, reference will be made to the apparatus 1 in the condition of use. Therefore, any references to a lower or upper position or to a horizontal or vertical orientation should be interpreted in such condition.

In particular, the screw transport apparatus for bottles 1 according to the invention may be used in a bottling plant for transferring bottles between two different stations of such a plant in cooperation with an inlet star wheel and an outlet star wheel.

According to a general embodiment of the invention, the screw transport apparatus 1 for bottles comprises:

a support structure 10, extending longitudinally between a bottle inlet 1a and a bottle outlet 1b of such an apparatus 1, and a spiral-shaped helical body 20, which is associated with the above support structure 10 and extends axially parallel to such a support structure 10 between two axial ends 20a, 20b thereof.

Operatively, the above spiral-shaped helical body 20 may be rotated axially on itself about its own longitudinal axis X to move bottles between the bottle inlet 1a and the bottle outlet 1b of the above apparatus 1 in cooperation with the support structure 10.

In particular, as illustrated in the accompanying Figures, the support structure 10 is positioned at a predefined distance from the spiral-shaped helical body 20. This distance is adjustable according to the size of the bottles to be transported. The support structure 10 acts as a longitudinal guide for the bottles engaged in movement by the spiral-shaped helical body. In particular, the support structure 10 supports the bottles from below and laterally, allowing the spiral-shaped helical body in rotation to impart to the bottles a linear motion substantially parallel to the axis of the spiral-shaped helical body.

The above spiral-shaped helical body 20 therefore defines the "screw" of the apparatus 1, where the meaning of "screw" is to be understood in the improper jargon sense used in the reference technical sector. In the following description, the terms "screw" and "spiral-shaped helical body" will be considered equivalent and one can be used as an alternative to the other.

According to an essential aspect of the present invention, the above spiral-shaped helical body 20 (screw) comprises at least two spiral-shaped seats 21, 22 which extend coaxially between the two axial ends 20a, 20b of the above spiral-shaped helical body 20, thus radically differentiating from the solutions of prior art, which instead use "screws" provided with a single spiral-shaped seat.

As illustrated in the accompanying figures, the above at least two spiral-shaped seats 21, 22 are angularly offset with respect to each other.

In other words, the spiral-shaped helical body 20 according to the invention defines a double-principle "screw" (double-rolling or double-helical), as opposed to the traditional "screws" which are single-principle (single-rolling or single-helical).

According to a further essential aspect of the invention, the above at least two spiral-shaped seats 21, 22 differ from each other by the shape and/or dimensions of the relative bottle housing compartment 21', 22' defined by each of them.

Figure 7:
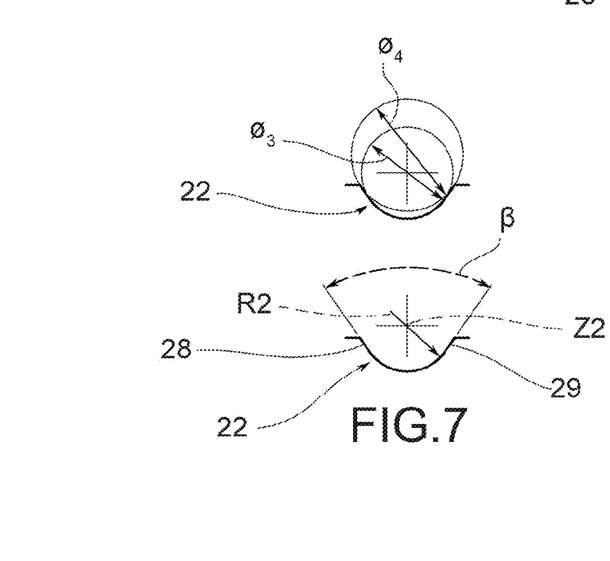
FIGS. 7 and 8 show in detail the dimensions and the shape of the section of the two helical-shaped seats with which the double spiral helix is provided.
Figure 8:
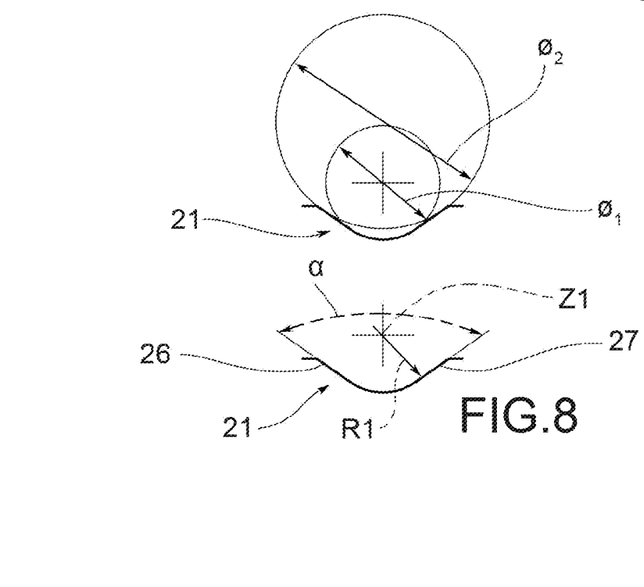

The shape and the dimensions of the bottle housing compartment 21', 22' of a spiral-shaped seat are defined by the shape and dimensions of the axial section of the spiral-shaped seat, where by axial section it is meant a section made along a plane passing through the longitudinal axis of the spiral-shaped helical body 20. Two examples of bottle housing compartment are shown in FIGS. 7 and 8.

Operatively, the above at least two spiral-shaped seats 21, 22 are intended to be used alternatively to the other for the transport of bottles having different shapes and/or dimensions that can be engaged by the respective compartments 21', 22'.

Compared to a traditional screw transport apparatus with a screw provided with a single spiral-shaped seat, the apparatus 1 according to the invention has a superior operating flexibility in terms of its ability to handle different bottle sizes, linked to the presence of at least two spiral-shaped seats having different bottle housing compartment.

The screw transport apparatus 1 for bottles according to the invention therefore allows increasing the operating range compared to a conventional screw, minimizing at the same time times and costs related to bottle format changes.

As already noted above, the two spiral-shaped seats 21, 22 are used alternatively one to the other according to the bottle format to be transported. From an operating point of view, the passage from one spiral-shaped seat to the other is carried out with a simple phasing operation of the selected spiral-shaped seat with the inlet star wheel and the outlet star wheel.

As will be resumed in the following, such a phasing operation may be performed manually or automatically. This operation is easy and fast and in any case requires a significantly shorter time than that required to replace a screw.

The apparatus 1 according to the invention therefore allows the user to quickly, automatically and safely adapt the configuration and operating features of the bottle screw transport apparatus to the format of bottles to be treated.

Being equal the total range of bottle formats that can be treated by a screw transport system, the apparatus 1 according to the invention also has a lower plant cost compared to a traditional apparatus. This is linked to the fact that the apparatus 1 according to the invention uses a single "screw" (spiral-shaped helical body), while the traditional apparatus must use two distinct "screws".

Advantageously, as will be shown below, said at least two spiral-shaped seats may have any shape and/or size (as long as they are different from each other), selected according to the format or formats that the spiral-shaped seat is designed to engage in use.

In particular, the single spiral-shaped seat 21, 22 may be sized to engage a specific and unique bottle format in use, typically bottles of non-standard shape, for example with a squared section, in particular with concave walls and edges in evidence, or with an ovoid section.

Alternatively, the single spiral-shaped seat 21, 22 may be sized to be able to engage a plurality of bottle sizes, typically bottles having a circular section.

Advantageously, two spiral-shaped seats 21, 22 may be provided in the same spiral-shaped helical body 20, both of which are sized to engage in use a specific and unique bottle size each. In this case, the two formats and specific bottle formats are different from each other, at least in terms of size (the two formats could possibly have the same proportions). In this particular configuration of the screw 20, the apparatus 1 according to the invention will be able to transport two different and specific bottle formats.

Alternatively, two spiral-shaped seats 21, 22 may be provided in the same spiral-shaped helical body 20, both of which are sized to engage in use a plurality or group (range) of bottle sizes each. In this case, the two plurality or groups of bottle formats that can be treated by the two seats are different from each other. In this particular configuration of the screw 20, the apparatus 1 according to the invention will be able to transport two different groups of bottle formats. In the latter case, preferably, the screw 20 performs the function of two traditional screws of the "universal type".

According to a further alternative, in the same spiral-shaped helical body 20 a spiral-shaped seat may be provided, sized to engage a specific and unique bottle size in use, while a second spiral-shaped seat is sized to engage a plurality or group (range) of bottle sizes in use. In this particular configuration of the screw 20, the apparatus 1 according to the invention will be able to transport both a group of bottle formats (typically bottles with circular cross-section), and a specific and unique bottle format (typically, a bottle of non-standard size). In the latter case, preferably, the screw 20 performs the combined function of a traditional "universal type" screw and a traditional screw dedicated to a particular format.

Figure 6:
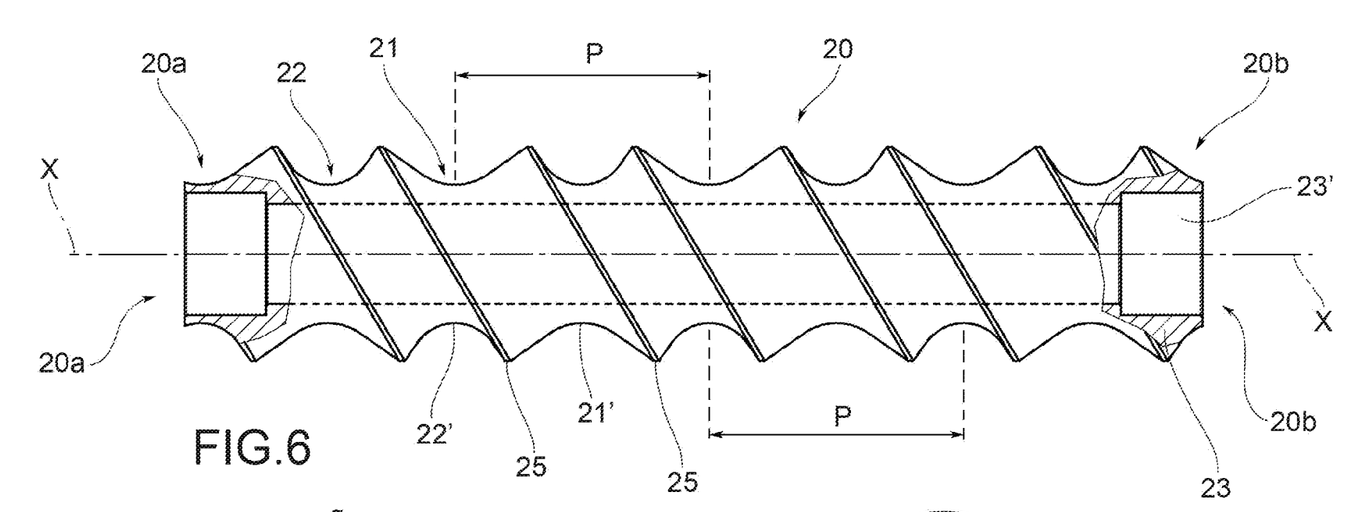
FIG. 6 shows an orthogonal view of a component of the apparatus shown in FIG. 4a, relating to a double spiral helix.

According to the preferred embodiment illustrated in the accompanying Figures and in particular in FIG. 6, the above spiral-shaped helical body 20 (screw) comprises only two spiral-shaped seats 21 and 22 which extend coaxially between the two axial ends 20a, 20b of such a spiral-shaped helical body 20. Such two spiral-shaped seats 21, 22 are angularly offset from each other and differ from each other by the shape and/or dimensions of the relative bottle housing compartment 21', 22' defined by each of them.

Although theoretically the screw 20 according to the invention may comprise more than two spiral-shaped seats, from a constructive and operative point of view it is preferable to provide only two of said spiral-shaped seats.

Preferably, as shown in particular in FIG. 6, the above two spiral-shaped seats 21, 22 are angularly offset from each other by 180°.

The two spiral-shaped seats are joined together to form ridges 25. Depending on the size and shape of the respective bottle housing compartments 21', 22' and the relative axial pitch P, the ridges 25 may have a flat top more or less extended in the axial direction.

Preferably, both in the case of two single seats or of three or more seats, the spiral-shaped seats are cylindrical, coaxial to each other and to the longitudinal axis of the spiral-shaped helical body 20 (screw). Alternatively, the spiral-shaped seats may be conical.

According to the embodiment shown in FIG. 6, the spiral-shaped seats 21, 22 (two or more than two) may have a constant axial pitch between the two axial ends 20a, 20b of the spiral-shaped helical body 20 (screw).

According to an alternative embodiment not shown in the accompanying figures, the spiral-shaped seats 21, 22 (two or more than two) may have a variable axial pitch between the two axial ends 20a, 20b of the spiral-shaped helical body 20 (screw).

Operatively, the pitch (constant or variable) P of the spiral-shaped seats is selected according to the "machine pitch Pm" of the stations (each defined by a rotary machine) connected to each other by the apparatus 1 in cooperation with relative star wheels.

Figure 3:
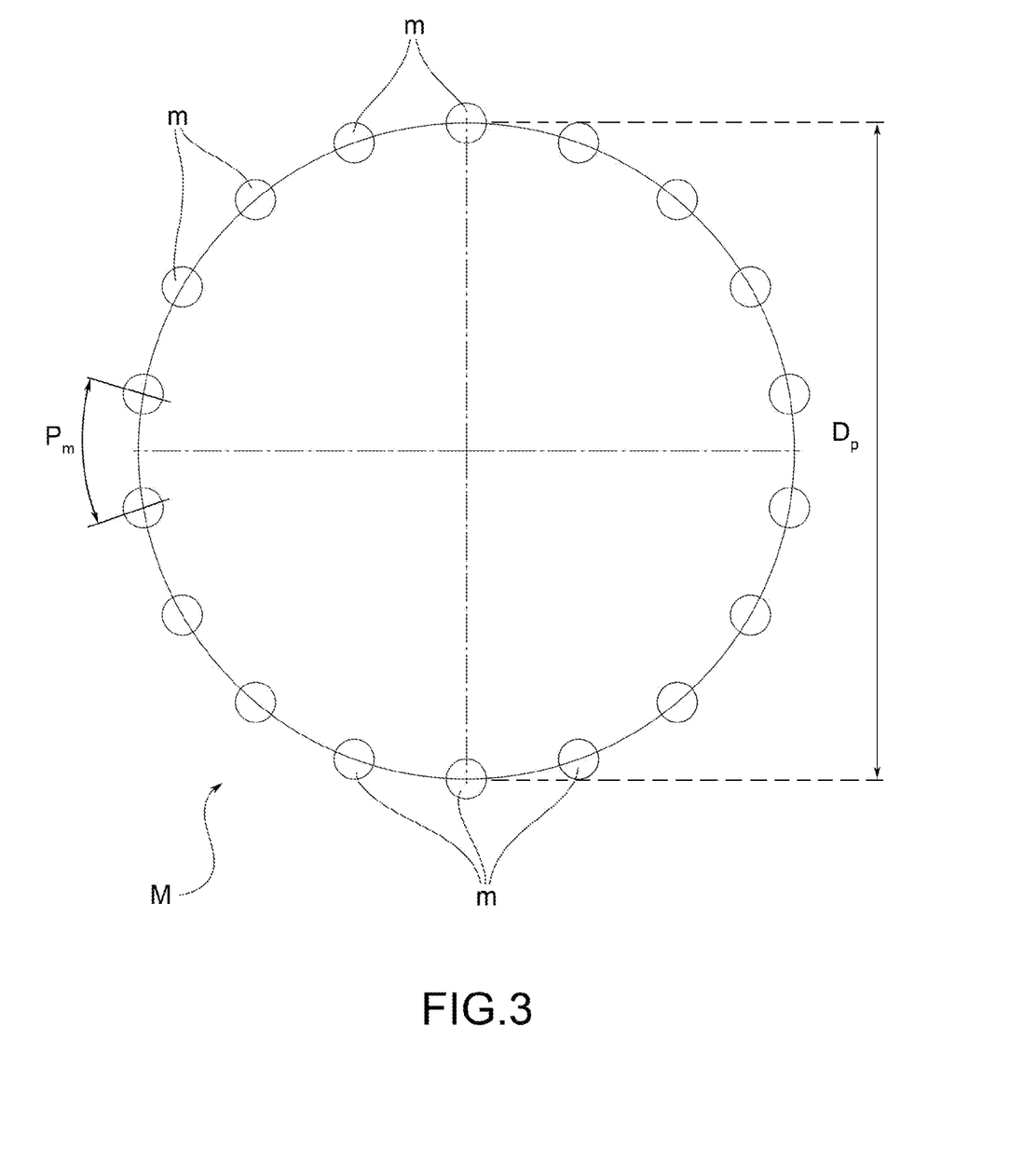
FIG. 3 shows a general diagram of an operating machine (filling machine, rinsing machine, etc.) in which the parameters suitable for defining the relative machine pitch are indicated.

More in detail, the "machine pitch Pm" is in fact the linear (or angular) distance between two vertical axes of the bottle workstations in a rotary machine, indicated with M in FIG. 3. The bottle stations m may be, for example, the bottle filling taps (in a filling machine), the nozzles for rinsing the bottles (in a rinsing machine) and the bottle capping heads (in a capping machine). From these basic workstations of the rotary machines, the machine pitch is obtained which is then reported in the relative bottle transfer star wheels and to the transfer screw. The screw in the simplest situation has the task of receiving the bottles with a "machine pitch" from an outlet star wheel and transferring them with this pitch to the next inlet star wheel. However, there may be more complex situations in which the screw receives bottles from the outlet star wheel with a "machine pitch" and then transfers them to the next inlet star wheel with another "machine pitch", modifying this "pitch" or distance between the bottles during its rotary motion from one star wheel to another. In the latter case, the screw (and the relative spiral-shaped seats) have a variable pitch. The machine pitch Pm in terms of linear distance is calculated as follows:

$$Pm = (Dp/n°pos) * \Pi$$

Where (with reference to FIG. 3):

Dp is the primitive diameter of the machine (or diameter on which the bottles are transferred)

n°pos is the number of workstations that the subject machine has (taps, heads, nozzles, etc.).

Advantageously, as noted above, the above at least two (two or more than two) spiral-shaped seats may have any shape and/or size (as long as they are different from each other), selected according to the format or formats that the spiral-shaped seat is designed to engage in use.

According to a first embodiment of the invention, each of the two (or more) spiral-shaped seats 21, 22 has an axial section adapted to engage bottles having a circular cross-section in plan view, included in a predefined dimensional range.

Preferably, as shown in particular in FIGS. 7 and 8, said axial section has the shape of a circular or elliptical arc (FIG. 7) or has a triangular shape with a blunt/rounded apex (FIG. 8).

More in detail, a first spiral-shaped seat 21 defines a compartment having an axial cross-section suitable to operatively engage in transport a plurality of bottle formats included in a first dimensional range of bottle formats, while the second spiral-shaped seat 22 defines a compartment having an axial cross-section suitable to operatively engage in transport a plurality of bottle formats included in a second dimensional range of bottle formats. The second dimensional range is different from the first dimensional range.

According to a particular embodiment, the first spiral-shaped seat 21 defines a compartment having an axial cross-section suitable to operatively engage in transport bottles with a circular plan cross-section having a diameter between 56 and 105 mm, while the second spiral-shaped seat 22 defines a compartment having an axial cross-section adapted to operatively engage in transport bottles with a circular plan cross-section having a diameter between 45 and 55 mm.

In particular, the first spiral-shaped seat 2 (see FIG. 8) has a bottle housing compartment of triangular shape with a blunt/rounded apex. If it is sized to handle bottles of circular plan cross-section having a diameter of between 56 mm (Ø1) and 105 mm (Ø2), the compartment may have a radius of curvature R1 with respect to the axis Z1 of the compartment equal to 28 mm and define between the two walls 26, 27 of the compartment an arc of angle α equal to 110°.

In particular, the first spiral-shaped seat 2 (see FIG. 7) has a bottle housing compartment having the shape of a circular arc. If it is sized to handle bottles with a circular plan cross-section having a diameter of between 45 mm (Ø3) and 55 mm (Ø4), the compartment may have a radius of curvature R2 with respect to the Z2 axis of the compartment equal to 22.5 mm and defining an arc of angle β equal to 70° between the two walls 28, 29 of the compartment.

According to a particular embodiment, each of the two (or more) spiral-shaped seats 21, 22 is suitable to engage only a specific bottle format, preferably having a non-circular plan cross-section.

In particular, a first spiral-shaped seat 21 defines a compartment having an axial section suitable for operatively engaging in transport only bottles of a first specific bottle format, while the second spiral-shaped seat 22 defines a compartment having an axial section suitable for operatively engaging in transport only bottles of a specific second bottle format. The second specific bottle format is different from the first format.

According to a further particular embodiment, a first spiral-shaped seat is adapted to engage bottles included in a predefined dimensional range, preferably having a circular plan cross-section, while a second spiral-shaped seat is adapted to engage only a specific bottle format, preferably having a non-circular plan section.

Preferably, the screw transport apparatus 1 for bottles according to the invention is used as a bottle transfer apparatus intended to operate between two different stations of a bottling plant in cooperation with an inlet star wheel S1 and an outlet star wheel S2.

As already noted above, the two spiral-shaped seats 21, 22 are used alternatively one to the other according to the bottle format to be transported. From an operating point of view, the passage from one spiral-shaped seat to the other is carried out with a simple phasing operation of the selected spiral-shaped seat with the inlet star wheel S1 and the outlet star wheel S2.

Preferably, the screw transport apparatus 1 for bottles according to the invention is not instead used as a bottle inlet apparatus to a bottling plant.

According to a preferred embodiment, said spiral-shaped helical body 20 (screw) comprises:
 an outer shell 23 which is axially hollow and on which the above (two or more) spiral-shaped seats 21, 22 are made externally; and
 a rotation shaft 24 axially fixed to said outer shell 23.

Figure 9:
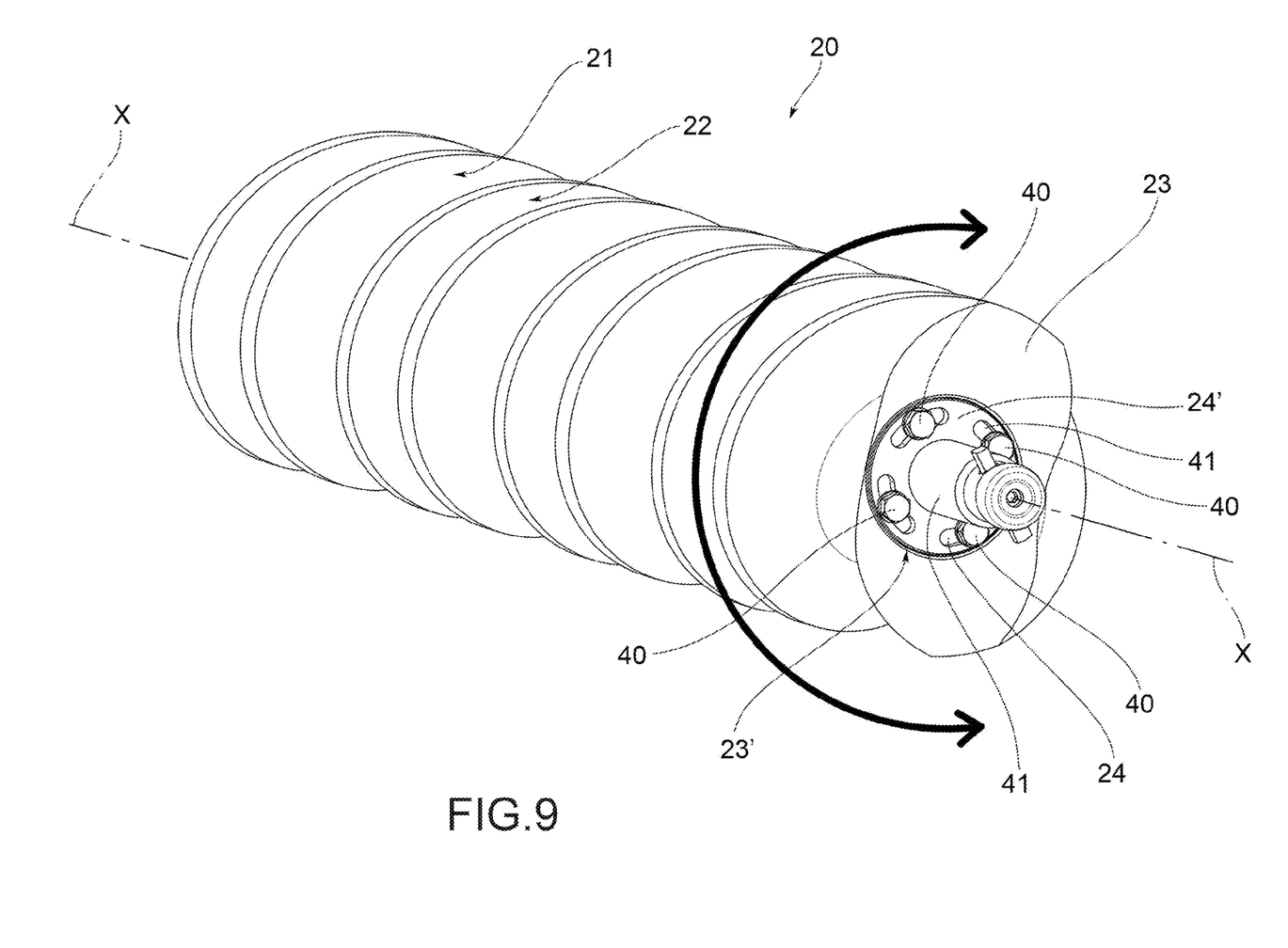
FIG. 9 shows a perspective view of a head portion of the double spiral helix of FIG. 5.

Advantageously, said rotation shaft 24 can be fixed axially in an angularly adjustable manner to the above outer shell 23. In particular, as shown in FIG. 9, the rotation shaft 24 is coaxially provided with at least one circular flange 24', which engages in a circular head seat 23' formed at at least one axial end 20b of the outer shell 23. The flange 24' is fixed to the outer shell through a plurality of screws 40, inserted in suitable hooking slots 41 (having the shape of a circular arc). The angular adjustment of the fixing between shell 23 and shaft 24 takes place as follows: loosen the screws 40 to free the relative rotation between the shell and the shaft; adjust the angular position between the shell and the shaft; tighten the screws in the selected angular position.

Operatively, during machine operation the screw 20 can receive the rotational movement from a mechanical kinematic chain connected to the rotary motion of the adjacent star wheels S1 and/or S2.

Alternatively, during machine operation, the screw 20 can receive the rotational movement from a motor 50 dedicated to the purpose.

Figure 10:
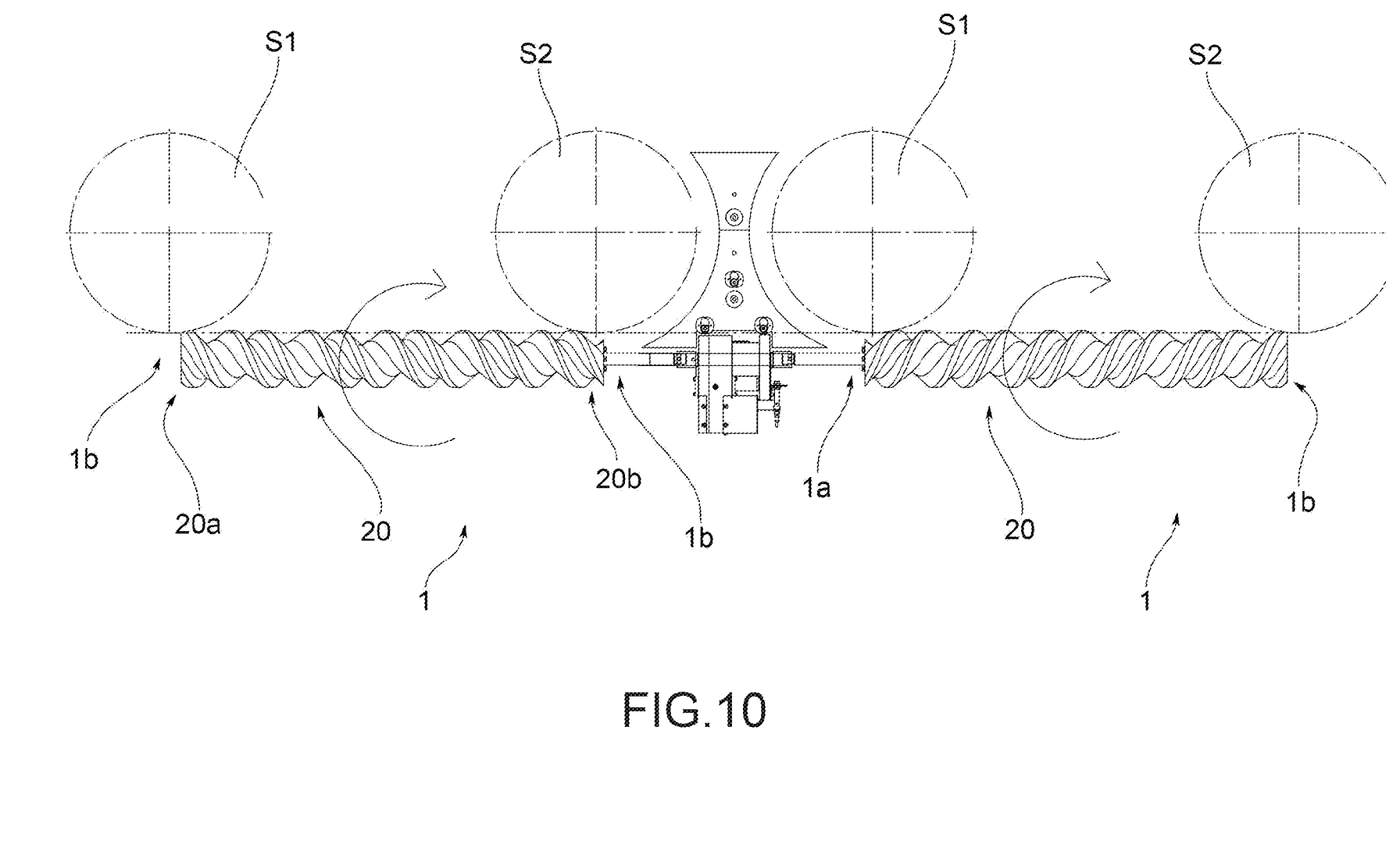
FIG. 10 shows a schematic view of two screw transport apparatuses for bottles according to the invention, arranged one at the inlet and one at the outlet of an operating machine (not shown), having a manual-type phasing system.

According to the embodiment shown in FIG. 10, the rotation shaft 24 of the screw 20 is suitable to be mechanically connected to means for moving the inlet star wheels S1 and the outlet star wheels S2 provided in the plant in which it is to be installed, so as to be able to be put in rotation by the means for moving the star wheels. In this case, the spiral-shaped seats 21, 22 (two or more) are brought alternately in phase with the bottle-holding compartments of the inlet and outlet star wheels by adjusting the angular fixing position between outer shell 23 and shaft 24, according to the manual procedure described above. In this case, one speaks of mechanical phasing. In the case in which the screw 20 has only two spiral-shaped seats 21 and 22 which are offset between them by 180°, the phasing takes place by rotating the outer shell by 180°.

Mechanical phasing is indispensable when the rotation of the screw 20 during the machine operation comes from a mechanical kinematic chain deriving from the rotary motion of the adjacent star wheels. In this situation the kinematic chain cannot be modified or calibrated as it is rigid/mechanical and therefore the only movable point of this chain is represented by the fastening screws between the outer shell and the screw shaft which are loosened so as to rotate the screw manually, regardless of the kinematic chain (or existing mechanical transmission).

Figure 11:
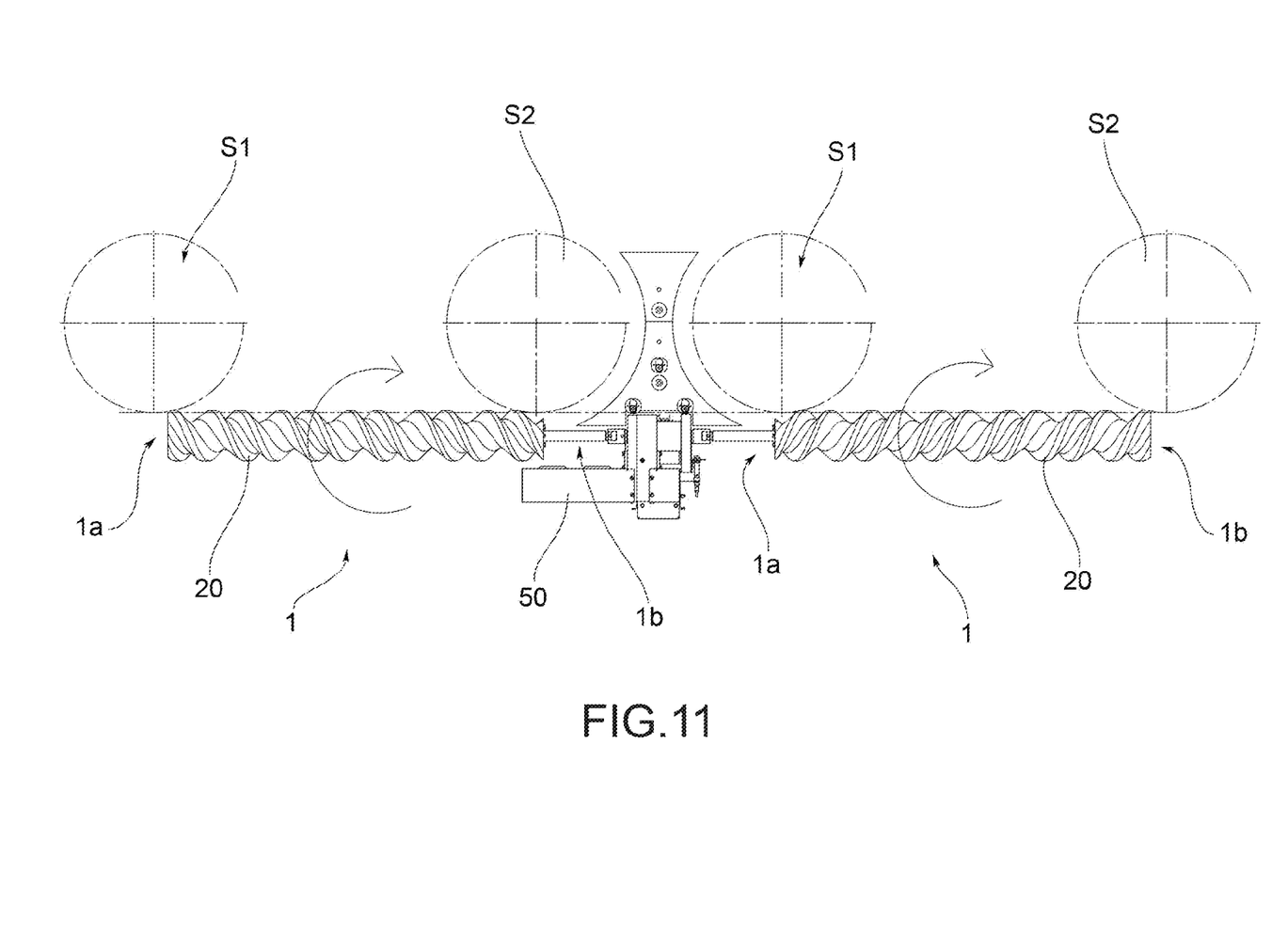
FIG. 11 shows a schematic view of two screw transport apparatuses for bottles according to the invention, arranged one at the inlet and one at the outlet of an operating machine (not shown), having an automated phasing system.

According to the embodiment shown in FIG. 11, the screw transport apparatus 1 comprises at least one electric motor 30 which can be kinematically coupled to the rotation shaft 24 to rotate the above spiral-shaped helical body 20 (screw). The above electric motor 30 is dedicated to the rotation of the spiral-shaped helical body 20.

Preferably, the above electric motor 50 is electronically controllable both for bringing alternatively one of the two spiral-shaped seats 21, 22 with the bottle-holding compartments of the inlet star wheels S1 and the outlet star wheels S2, and for bringing the rotation of the spiral-shaped helical body 20 into phase with the rotation of the inlet star wheels S1 and the outlet star wheels S2. In this case, it is therefore possible to perform an automatic phasing of the screw with the star wheels S1 and S2 through an adjustment of the motor 50.

Automatic phasing is possible when the screw is rotated by its own dedicated motor. The kinematic chain at this point is no longer mechanically rigid, but the "electric axes" between the star wheel driving motors and the screw rotation motor are exploited. In this case, the constant phasing in rotation is guaranteed by the software of the bottling electronic control unit that continuously monitors the phasing (or electrical axes) between the various drive motors. In this case it is not necessary to operate manually on the screws 40 for fixing the outer shell to the shaft. This operation can be provided only if necessary in the initial steps of setting the screw at the time of installation of the apparatus 1.

Figure 4A:
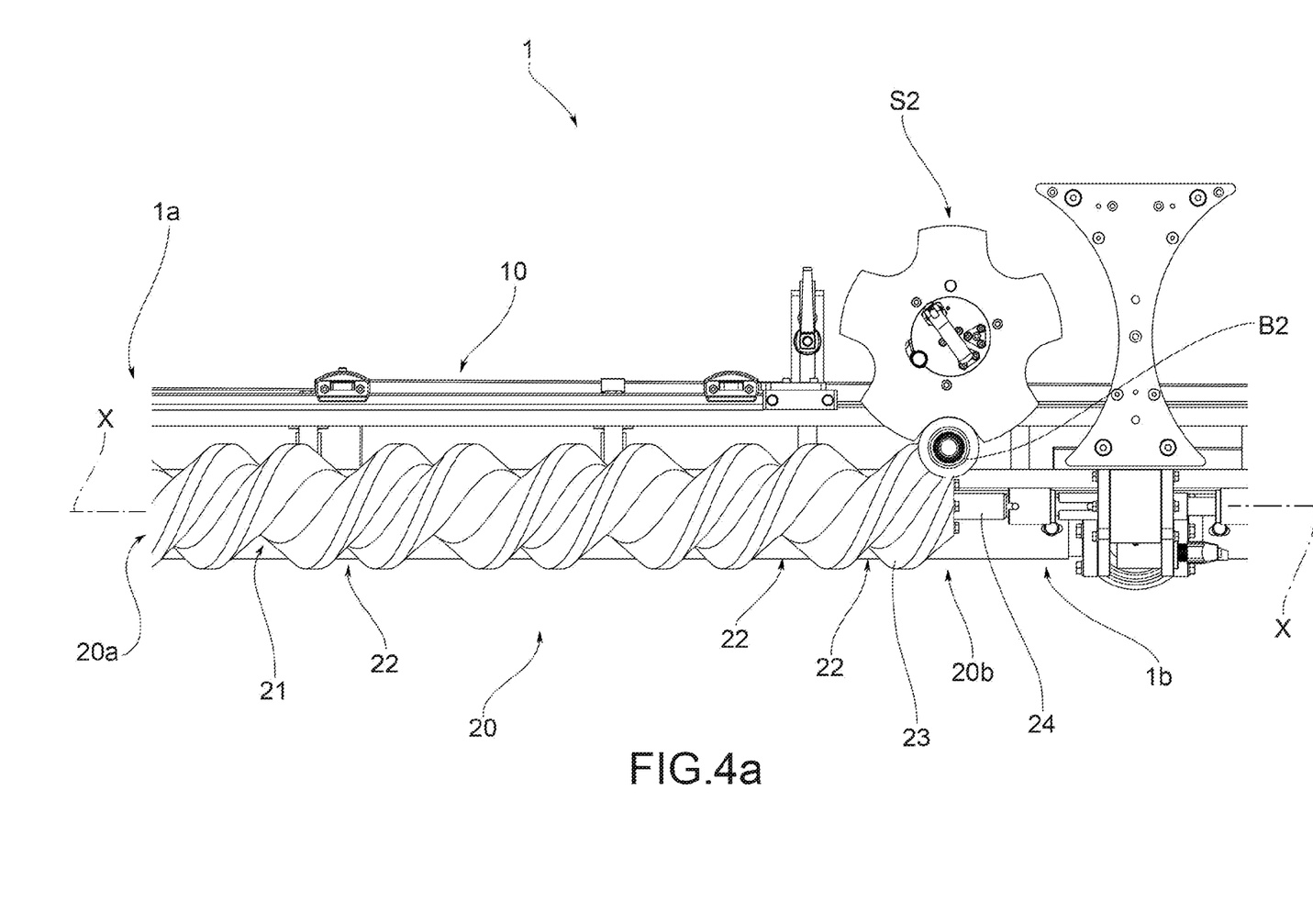
Figure 4B:
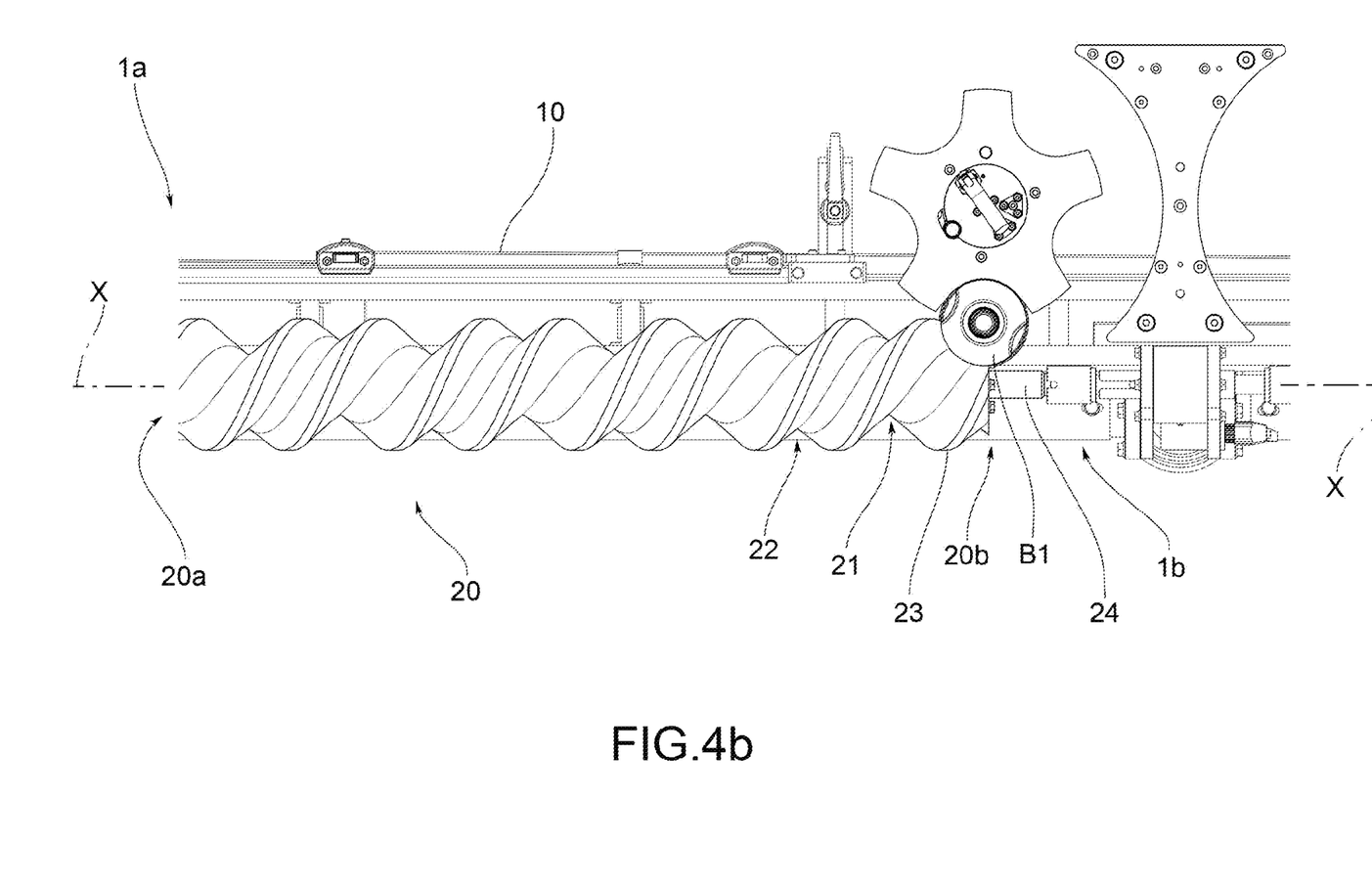

In FIGS. 4a and 4b, a screw transport apparatus 1 according to the invention is illustrated, respectively illustrated with a second spiral-shaped seat 22 in phase with the outlet star wheel S2 (the bottle of a first format is indicated with B2) and with a first spiral-shaped seat 21 in phase with the outlet star wheel S2 (the bottle of a second format is indicated with B1).

Figure 5:
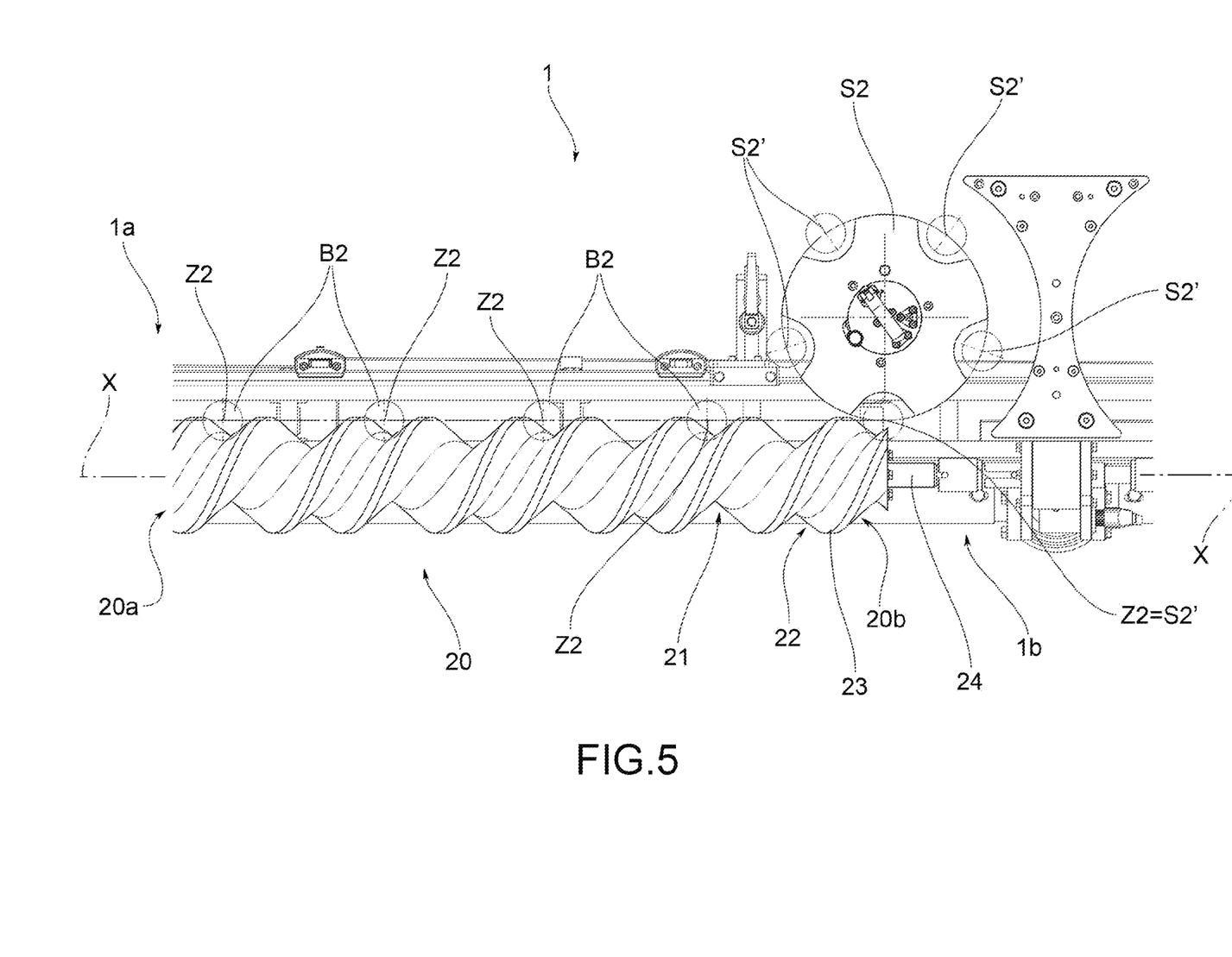
FIG. 5 shows the screw transport apparatus for bottles of FIG. 4a, illustrated while engaging some bottles.

More in detail, in the case of manual phasing, the phasing operation consists (once the rotation of the outer shell is freed from the shaft) in rotating the screw until one of the "star wheel compartment axes" (denoted by s2' in FIG. 5) with the first axis of the bottle housing compartment of one of the spiral-shaped seats, where by first axis it is meant the axis of the compartment at the axial end 20a or 20b of the screw. In this way the motion of the bottle to be transferred will be linear and free of jolts in the passage from star wheel compartment to the screw compartment and vice versa. In the phasing, the star wheels are not touched/phased, but only the screw is phased. This phasing operation takes place in the machine testing step and must be repeated when the active spiral seat must be changed, or if the fixing screws 40 are no longer in place.

The automatic phasing occurs in the same way, with the only difference being that it is performed by the screw rotation motor. In this case the correct phasing value (in terms of the angular position of the motor shaft for each spiral-shaped seat) is stored by the electronic unit responsible for controlling the apparatus 1 and made available each time it is used to restore a position in phase of the screw. The value is always stored during the testing of the apparatus.

The subject of the present invention is also a bottling system, comprising at least two treatment stations connected to each other by a screw transport apparatus for bottles, which receives in input bottles from a first treatment station through an inlet star wheel S1 and releases in output bottles received as input to a second treatment station via an outlet star wheel S2.

Each treatment station consists of a rotary machine, such as a rinsing machine, a filling machine or a capping machine The above screw transport apparatus for bottles consists of a screw transport apparatus for bottles 1 according to the invention, and in particular as described above.

Operatively, such an apparatus 1 is intended to be used with one of the two spiral-shaped seats 21 or 22 placed in phase with the bottle holding compartments of the above inlet and outlet star wheels S1, S2 depending on the size of the bottles and the bottling system should process.

The invention allows several advantages to be achieved, some of them already described.

Compared to a traditional screw transport apparatus with a screw provided with a single spiral-shaped seat, the screw transport apparatus 1 for bottles according to the invention has a superior operating flexibility in terms of its ability to handle different bottle sizes, linked to the presence of at least two spiral-shaped seats having different bottle housing compartment.

The screw transport apparatus 1 for bottles according to the invention therefore allows increasing the operating range compared to a conventional screw, minimizing at the same time times and costs related to bottle format changes.

The screw transport apparatus for bottles according to the invention is also simple and cost-effective to manage.

In fact, from an operating point of view, the passage from one spiral-shaped seat to the other is carried out with a simple phasing operation of the selected spiral-shaped seat with an inlet star wheel and an outlet star wheel. Such a phasing operation may be performed manually or automatically. This operation is easy and fast and in any case requires a significantly shorter time than that required to replace a screw.

The apparatus 1 according to the invention therefore allows the user to quickly, automatically and safely adapt the configuration and operating features of the bottle screw transport apparatus to the format of bottles to be treated.

With the same total range of bottle formats that can be treated by a screw transport system, compared to a traditional apparatus, the apparatus 1 according to the invention also has a lower plant cost. This is linked to the fact that the apparatus 1 according to the invention uses a single "screw" (spiral-shaped helical body), while the traditional apparatus must use two distinct "screws".

The screw transport apparatus for bottles is also simple and cost-effective to manufacture, since compared to a traditional apparatus it requires the realization of at least two spiral-shaped seats in the screw, instead of just one. This processing is not operationally complicated to perform and does not particularly affect the cost of the "screw".

The invention thus conceived thus achieves the intended purposes.

Of course, it may take, in its practical embodiment, also shapes and configurations other than the above without departing from the present scope of protection.

Furthermore, all details may be replaced with technically equivalent elements and dimensions, shapes and materials used may be any according to the needs.

The invention claimed is:

1. Screw transport apparatus for bottles, comprising:
a support structure, extending longitudinally between a bottle inlet and a bottle outlet of said apparatus, and
a spiral-shaped helical body, which is associated with said support structure and extends axially parallel to said support structure between its two axial ends, wherein said spiral-shaped helical body is rotatable on itself around its own longitudinal axis to move bottles between the bottle inlet and the bottle outlet of said apparatus in cooperation with said support structure,
wherein said spiral-shaped helical body comprises at least two spiral-shaped seats, each spiral-shaped seat extending coaxially between the two axial ends and along an entire length of said spiral-shaped helical body, wherein said at least two spiral-shaped seat are angularly offset from each other and differ from each other in the shape and/or size of the relative bottle housing compartment defined by each of them, wherein each spiral-shaped seat of said at least two spiral-shaped seats are intended to independently transport bottles of a different shape and/or size engageable by the respective compartments.

2. Apparatus according to claim 1, wherein said spiral-shaped helical body comprises only two spiral-shaped seats which extend coaxially between the two axial ends of said spiral-shaped helical body, wherein said two spiral-shaped seats are angularly offset from each other and differ from each other in the shape and/or size of the relative bottle housing compartment defined by each of them, wherein said two spiral-shaped seats are intended to be used as an alternative to one another for the transport of bottles of a different shape and/or size engageable by the respective compartments.

3. Apparatus according to claim 2, wherein said two spiral-shaped seats are angularly offset from each other by 180°.

4. Apparatus according to claim 2, wherein each of said two spiral-shaped seats has an axial cross-section suitable to engage bottles having a circular plan cross-section, included in a predefined dimensional range, preferably said axial cross-section being the shape of an arc of a circle or elliptic or being a triangular shape with bevelled apex.

5. Apparatus according to claim 2, wherein a first of said two spiral-shaped seats defines a compartment having an axial cross-section suitable to operatively engage in transport a plurality of bottle formats included in a first dimensional range of bottle formats and wherein a second of said two spiral-shaped seats defines a compartment having an axial cross-section suitable to operatively engage in transport a plurality of bottle formats included in a second dimensional range of bottle formats, said second dimensional range being different from said first range.

6. Apparatus according to claim 5, wherein said first spiral-shaped seat defines a compartment having an axial cross-section suitable to operatively engage in transport bottles with a circular plan cross-section having a diameter between 56 and 105 mm, while said second spiral-shaped seat defines a compartment having an axial cross-section adapted to operatively engage in transport bottles with a circular plan cross-section having a diameter between 45 and 55 mm.

7. Apparatus according to claim 2, wherein each of said two spiral-shaped seats is suitable to engage only a specific bottle format, preferably having a non-circular plan cross-section.

8. Apparatus according to claim 7, wherein a first of said two spiral-shaped seats defines a compartment having an axial cross-section suitable to operatively engage in transport only bottles of a first specific bottle format and wherein a second of said two spiral-shaped seats defines a compartment having an axial cross-section suitable to operatively engage in transport only bottles of a second specific bottle format, said second specific bottle format being different from the first format.

9. Apparatus according to claim 2, wherein a first seat of said two spiral-shaped seats is suitable to engage bottles included in a predefined dimensional range, preferably having a circular plan cross-section, and wherein a second seat of said two spiral-shaped seats is suitable to engage only a specific bottle format, preferably having a non-circular plan cross-section.

10. Apparatus according to claim 2, wherein said two spiral-shaped seats have a constant axial pitch between the two axial ends of said spiral-shaped helical body.

11. Apparatus according to claim 2, wherein said two spiral-shaped seats have an axial pitch varying between the two axial ends of said spiral-shaped helical body.

12. Apparatus according to claim 2, wherein said screw transport apparatus for bottles is a bottle transfer apparatus designed to operate between two different stations of a bottling plant in cooperation with an inlet star wheel and an outlet star wheel.

13. Apparatus according to claim 1, wherein said spiral-shaped helical body comprises:
   an outer shell which is axially hollow and on which said two spiral-shaped seats are made externally; and
   a rotation shaft axially fixed to said outer shell.

14. Apparatus according to claim 13, wherein said rotation shaft can be fixed axially in an angularly adjustable manner to said outer shell.

15. Apparatus according to claim 14, wherein said screw transport apparatus for bottles is a bottle transfer apparatus designed to operate between two different stations of a bottling plant in cooperation with an inlet star wheel and an outlet star wheel and wherein said rotation shaft is suitable to be mechanically connected to means for moving said inlet and outlet star wheels to be rotated by the latter, and wherein the two spiral-shaped seats are led alternately in phase with the bottle gripping compartments of the inlet and outlet star wheels by adjusting the angular attachment position between the outer shell and shaft.

16. Apparatus according to claim 13, wherein said screw transport apparatus for bottles is a bottle transfer apparatus designed to operate between two different stations of a bottling plant in cooperation with an inlet star wheel and an outlet star wheel and wherein said apparatus comprises at least one electric motor which can be kinematically coupled to said rotation shaft to rotate said spiral-shaped helical body, wherein said electric motor is dedicated to the rotation of said spiral-shaped helical body and can be electronically controlled both to lead in phase alternately one of the two spiral-shaped seats with the bottle gripping compartments of the inlet and outlet star wheels, and to lead in phase the rotation of the spiral-shaped helical body with the rotation of the inlet and outlet star wheels.

17. Bottling system, comprising at least two treatment stations connected to each other by a screw transport apparatus for bottles, which receives in input bottles from a first treatment station via an inlet star wheel and releases in output the bottles received in input at a second treatment station via an outlet star wheel, wherein said screw transport apparatus for bottles consists of a screw transport apparatus for bottles according to claim 1 and wherein operatively said apparatus is designed to be used with one of the two spiral-shaped seats put in phase with the bottle gripping compartments of said inlet and outlet star wheels according to the bottle format which the bottling system is required to handle.

\* \* \* \* \*